United States Patent [19]
Nogi et al.

[11] 4,138,445
[45] Feb. 6, 1979

[54] FLAME RETARDANT FIBER

[75] Inventors: Tatsuo Nogi; Yasuo Yoshizawa; Kanzi Kashihara; Nobuo Yoshizumi; Yoshizo Tsuda, all of Otsu, Japan

[73] Assignee: Toray Industries, Inc., Tokyo, Japan

[21] Appl. No.: 845,336

[22] Filed: Oct. 25, 1977

Related U.S. Application Data

[63] Continuation of Ser. No. 575,590, May 8, 1975, abandoned.

[30] Foreign Application Priority Data

May 21, 1974 [JP] Japan .................................. 49-56109

[51] Int. Cl.² ...................... C08L 61/28; C08L 61/24; C08L 61/34; C08L 29/04
[52] U.S. Cl. .................................... 260/844; 260/851; 260/856; 264/176 F; 264/178 F; 264/185; 264/205; 428/364; 428/401
[58] Field of Search ....................... 260/844, 851, 856; 264/176 F, 178 F, 185; 428/364, 401

[56] References Cited

U.S. PATENT DOCUMENTS

| | | | |
|---|---|---|---|
| 2,376,511 | 5/1945 | Saunders et al. | 260/856 |
| 2,810,426 | 10/1957 | Till et al. | 264/176 F |
| 2,988,469 | 6/1961 | Watson | 264/176 F |
| 3,489,820 | 1/1970 | Henson et al. | 260/834 |

Primary Examiner—John C. Bleutge
Attorney, Agent, or Firm—Miller & Prestia

[57] ABSTRACT

A flame-retardant fiber is made comprising 20 – 95% by weight of amino resin condensate of an amino compound and formaldehyde in which the amino compound may be a melamine, combined melamine and guanamine, combined melamine and urea, combined melamine, guanamine and urea, and benzoguanamine and/or urea, and in which the chemical bond linking the polymer chain is for the most part methylene linkage and 80 – 5% by weight of polyvinylalcohol, the resulting fiber being cured when necessary and having a tensile strength of at least 1.0 g/d., and having a break elongation of at least 5%.

15 Claims, No Drawings

FLAME RETARDANT FIBER

This is a continuation, of application Ser. No. 575,590, filed May 8, 1975 now abandoned.

BRIEF SUMMARY OF THE INVENTION

The hazardous increase in fires from the combustibility of many fabrics and plastics resulting in the loss of human life and in the loss of property has necessitated the strict regulation of fire-extinguishing or fire-prevention equipment and/or systems and in the discovery of fibers which are flame retardant.

The present invention relates to a novel nonflammable fiber consisting essentially of amino resins and polyvinylalcohol (hereinafter referred to as PVA), with the amino resins being obtained by the reaction of formaldehyde with amino resin-making amino compounds in water and/or in polar solvents such as dimethylsufloxide (DMSO), N-methyl-2-pyrrolidone (NMP), dimethylacetamide (DMAc) or hexamethyl phosphoamide (HMPA) in the presence of an acid or in an acidic condition. The mixture resulting from the amino resin obtained in the above manner and PVA dissolved in the solvent is spun into fibers and cured when necessary.

With the foregoing in mind, it is the object of the present invention to provide a fiber which is flame-retardant and which can be used, therefore, without fear of combustibility and without the need of elaborate fire-extinguishing or fire-prevention equipment and systems.

Other objects and advantages will become more apparent in the following detailed description and examples.

DETAILED DESCRIPTION

The flame-retardant fibers made in accordance with the present invention are composed of 20–95% by weight of amino resin condensate in which the chemical bonds linking the polymer chain are at least 50% methylene linkages and 80–5% by weight of PVA.

The fiber of the present invention is prepared by spinning a solution of 20–95% by weight of amino resins formed by the reaction of amino resin-forming amino compounds and formaldehyde in water or a polar solvent and 80–5% by weight of PVA followed by washing, drawing, heat treating and, when necessary, curing.

In practice, amino resins are generally used as adhesives, in polywoods, decorative laminates and paper impregnants. Urea-formaldehyde resins, melamine-formaldehyde resins and guanamine-formaldehyde resins are typical examples of amino resins which are widely used.

Uncured amino resins are generally known as methylol-type resins in which amino-functional groups of the amino compounds are hydroxymethylated. The methylol-type resins are thus in the form of shaped articles cured to form insoluble and infusible thermosetting resins. However, these uncured amino resins comprising hydroxymethylated amino compound monomers or oligomers are very unstable under heat and chemical reactions. A slight heating of these resins easily leads to crosslinking or gelation, making it impossible to apply these resins in further chemical reactions or blending them with other reactive materials. This instability has been a chief reason for the difficulty in obtaining a stable, blended solution of the amino resin and PVA which has many pendant hydroxy groups capable of reacting with the amino resin leading to a gradual increase in viscosity or gelation of the blend. Therefore, it has hitherto been possible to blend only a small amount of amino resin with PVA in a solution.

The amino resin of the present invention is particularly manufactured to be soluble or homogeneously dispersible in water and/or in a polar solvent such as DMSO, NMP, HMPA, DHAc, or a proper combination thereof, and capable of reacting with proper aldehyde compounds to make higher molecules or crosslinked polymers, for making a stable solution in the presence of the proper amount of PVA.

The amino resins in this invention are condensate products of amino compounds and formaldehyde in which the amino compound units are mainly connected by methylene bonds.

For purposes of clarity, the term "methylene content" is defined as follows:

Methylene Content (%)

$$= \frac{\text{the methylene groups in the amino resin (moles)}}{\text{the sum of hydroxymethyl groups and methylene groups in the amino resin (moles)}} \times 100$$

The methylene content of the amino resins of the present invention should be at least 50%, preferably more than about 70%.

The solutions of the amino resins of high methylene content of the present invention are stable at room temperature and even at elevated temperatures because of the small content of the reactive hydroxymethyl groups.

The amino compounds used to obtain the amino resin used in the present invention include melamine or its derivatives such as cyclohexyl melamine; guanamine compounds such as benzoguamine or acetoguanamine, and urea and its derivatives such as methylurea. As will be seen hereinafter, certain combinations of these amino compounds are more favorable than others.

Other compounds capable of condensate reaction with formaldehyde such as sulfamide, guanidine, aniline, phenol, and xylene can be used as minor comonomer components. As the source of formaldehyde, formaline (an aqueous solution of formaldehyde) is conveniently used in obtaining the amino resin of this invention. Methanol or DMSO solutions of formaldehyde may also be used, and paraformaldehyde, trioxane and tetraoxymethylene which are capable of splitting off formaldehyde by decomposition in the course of reaction may also be used in the amino resin formation reaction in the place of formaldehyde.

The affinity of amino resin to solvents depends on the kind of amino resin, the degree of polymerization and the acid content of the solution and therefore, it is important to choose a suitable condition for polymerization. DMSO is an especially good solvent for the preparation of this amino resin in that it can dissolve well the amino compound, formaldehyde, PVA and the formed amino resin which has several methylene bonds. Other polar solvents such as DMAc, HMPA and NMP are somewhat inferior to DMSO.

In an aqueous solution, the polymerization of the amino resin of high methylene content is difficult in view of the poor solubility of the condensate in water. In this case, the condensate can be emulsified in water by the addition of some emulsifying agents or solubilized by the formation of an acid complex.

Preparation of the soluble acid-polymer complex is carried out by the addition of a quantitative amount of acid which is used as a catalyst for preparing the amino resin condensate.

As a catalyst in the preparation of the amino resin used in the present invention, inorganic acids such as hydrochloric acid, sulfuric acid, phosphoric acid, etc.; organic acids such as oxalic acid, formic acid, etc.; Lewis acids such as aluminum chloride, zinc chloride, and sulfonic acids such as p-toluenesulfonic acid may be used. Compounds which generate acid by hydrolysis, pyrolysis, etc., may also be used. The desirable quantity of such acid is 0.03–3.5 mole of acid per mole of the amino compound.

With reference to the degree of condensation of the resin, control is comparatively easy but is nonetheless important since it is closely related to the stability of the resin solution.

Referring to the molar ratio (F/A) of formaldehyde (F) to amino compound (A) of the resin used in the present invention, such ratio is 0.6–2.0. When this ratio is smaller than 0.6, the molecular weight of the resin is comparatively small and a large amount of unreacted monomer is apt to remain. On the other hand, when this ratio is larger than 2.0, the molecular weight of resin is quite high and sometimes gelation occurs. Therefore, it is desirable for the molar ratio (F/A) to be 0.7–1.5, and more preferably 0.77–1.2.

Other reaction conditions such as reaction time, temperature and concentration vary with the kind of amino compounds used. For example, the reactivity of melamine is comparatively great and hence it is desirable to make the monomer concentration and reaction temperature as low as possible. On the other hand, the reactivity of benzoguanamine and urea is comparatively small and therefore it is desirable to make the monomer concentration and reaction temperature as high as possible. The reaction temperature should be lower than the boiling point of the solvent, preferably 50–100° C.

The proper concentration of the resin is dependent on the kind of resin and the degree of polymerization. Generally, concentration is 1–70% and preferably 5–40% in order to obtain a practical and stable solution, which solution may be clear or turbid depending on the preparative conditions such as concentration, the kind of amino compound, the amount of acid, etc. However, even when the solution is turbid, it is usually stable and uniform.

This solution of reaction mixture can be precipitated using an organic solvent such as alcohol or acetone as the precipitating agent. The solid resin obtained is then dissolved again in the first solution, in the presence of proper acids when necessary.

The amino resin condensate has rather many methylene bonds as manifested by the oxygen content of the resin which is very low and by idometry, usually used for the determination of the quantity of methylene bonds in an amino resin. A polar solvent such as DMSO hardly affects the idometry.

Polyvinylalcohol (PVA) used in the present invention is obtained by saponification of polyvinylacetate with an alkali or acid. PVA having some acetyl groups and PVA which has been formalized, acetalized or butyralized may also be used. It is also possible to copolymerize other vinyl monomers with vinyl acetate but it is desirable to use PVA resulting from a high degree of saponification.

The method of blending the amino resins used in the present invention with PVA is not restrictive. For example, it is desirable to dissolve solid PVA in a solution of amino resin or to mix a solution of PVA with the solution of amino resins.

The spinability and the flame-retardance of the fiber depend on the ratio of the amino resin to PVA. Therefore, it is necessary for the PVA content in the resulting polymer-resin system to be about 5–80% by weight, preferably about 20–70% by weight. When said content is less than about 5% by weight, spinability is impaired. On the other hand, when said content exceeds about 80% by weight, the flame-retardance capability of the resulting fiber is adversely affected with the object of the present invention not being achieved.

Also, it is desirable for these amino resins to be reacted with some parts of PVA, for PVA can also react with formaldehyde. When the chemically bonded combination exists, the flame-retardance of the resulting fiber is improved.

The method used for spinning the resulting solution to fibers maybe either a dry or a wet spinning method. The molecular weight of amino resins used is not restrictive, but it is necessary that said amino resins be soluble or homogeneously dispersible in the solvent. Generally, the amino resins having a high molecular weight have better spinability, but the amino resins having exceedingly high molecular weight are quite susceptible to gelation and spinning of the resulting spinning solution may be difficult. As a result, it is necessary that the viscosity of the spinning solution be properly controlled, said viscosity being about 10–1700 poises at the spinning temperature, preferably about 50–500 poises. Suitable concentration of the spinning solution varies according to the spinning method employed and the kind of amino resins, PVA and the molecular weight of the PVA. Generally, however, it is about 5–80% by weight, preferably about 10–60% by weight. When said concentration is less than about 5% by weight, spinability and productivity are impaired. On the other hand, when said concentration exceeds about 80% by weight, the spinning solution tends to be heterogeneous and unstable.

Additives may be mixed in the spinning solution to improve its blend and stability. As additives, viscosity stabilizing reagents, frosting reagents or reagents for enhancing flame-retardance are used. Of particular desirability is the adding of the acid used as catalyst for forming amino resins to the heterogeneous spinning solution, in which case the solution often becomes homogeneous and more stable.

In wet spinning, the spinning solution is degassed, filtered and then is spun through wet spinning nozzles made of an alloy of gold and platinum or stainless steel, each nozzle orifice having a diameter of 0.05–0.3 mm, into a coagulation bath. As a coagulation bath, alcohols such as methanol and butanol, ketones such as acetone and cyclohexanone, aqueous solutions of salt such as $Na_2SO_4$, $(NH_4)_2SO_4$, $K_2SO_4$, $CH_3COONa$, $K_2CO_3$, $NaCl$, $KCl$, $NH_4Cl$, $CaCl_2$ and a mixed solution of water and water-soluble solvent containing said salt are preferably used.

When the spinning solution contains a polar solvent, the polar solvent is added to the coagulation bath to control the coagulation power and to assure continuously stable spinning. This is preferable since change of composition in the coagulation bath is often decreased during spinning and the coagulation power is controlled by the quantity of added solvent. If the spinning solution contains an acid, the acid is preferably neutralized in spinning by adding an alkali to the coagulation bath.

An aqueous solution of an alkali such as NaOH, KOH or ammonia is preferable because it contributes to a neutralizing of the spinning solution and also to the improvement of coagulation power as well. In this case the salt produced by neutralizing the alkali is preferably added to the coagulation bath. The suitable composition and ratio of the coagulation bath varies, more or less, according to the kinds of amino resins and PVA, the ratio of amino resins to PVA, the condition of the mixed solution, and the concentration of the spinning solution.

Usually the spun undrawn yarn is drawn at a predetermined draw ratio by conventional methods in air or in a suitable bath, and then washed with water.

After the wet-spun fibers are washed with water, they are dried with hot air or a hot plate. Hot-drawing is usually carried out in order to improve the properties of the fibers. If necessary, a second or even a second and third stage of hot-drawing may be used. It is often preferred to heat treat the fibers at a temperature higher than hot-drawing which remarkably decreases the shrinkage of the fibers. For dried fibers containing a rich amino resin, hot-drawing may be omitted and simple heat treatment carried out to improve the properties of the fibers. The fibers are usually drawn at a temperature higher than 140° C., and the hot-drawing temperature varies with the ratio of amino resins to PVA or the water content in the fiber.

In the hot-drawing and heat treating processes, it is estimated that grass-like, tenacious and fireproofing fibers are formed as a result of the orientation of PVA and the reaction of PVA and amino resin.

The dry-spinning technique may be applied to fiberize the mixture of PVA and amino resin. A concentrated solution of PVA and amino resin is extruded to an atmosphere the temperature and relative humidity of which are controlled. The fibrous materials thus formed are exposed to the drying action of hot air. It is preferable to carry out hot-drawing and heat treatment. It is preferable to cure those fibers produced by wet or dry spinning when such fibers do not have satisfactory resistance to heat and flame. Curing is not to be limited to the finished fiber after hot-drawing and heat treatment, but the fibers in the coagulating bath, or in the process of being washed with water or in the drying machine in the case of wet spining. In dry spinning, curing may be carried out simultaneously with fiberization. Aldehydes are used to cure these fibers.

Curing of the uncured fibers is effected by heating in a liquid or gaseous formaldehyde environment in the presence of a catalyst. It appears that the curing mechanism involves the diffusion of the formaldehyde into the fiber and the reaction of the amino resin and formaldehyde to bring about polymerization of the amino resin. In the curing process, it is estimated that formaization of PVA and cross-linking of PVA and amino resin with formaldehyde also occurs. The cured fibers possess a number of highly desirable properties, such as remarkable resistance to heat and flame, and excellent mechanical properties.

To effect the presence of an acid catalyst during curing, one means employed is to incorporate a small amount of a suitable acid into the spinning solution prior to fiberization. The fibers may then be treated in a liquid or gaseous formaldehyde-containing environment.

Another means of preparing the cured fiber is blending the spinning solution with the compound evolving formaldehyde upon contact with an acid prior to fiberization. Then the fibers may be treated in the presence of an acid. Formaldehyde may be employed in a liquid or gaseous environment, but it is preferably used in a liquid environment in the presence of an acid catalyst. Paraformaldehyde, trioxane or tetraoxane as well as formaldehyde may be employed as the compound evolving formaldehyde. When curing is carried out in a gaseous environment, hydrogen chloride or hydrogen bromide may be employed as an acid catalyst. When a solution is employed in the curing step, any of a wide variety of acids may be used as the catalyst, including mineral acids such as hydrochloric, sulfuric and phosphoric acid; organic acids such as oxalic acid; sulfonic acids such as p-toluene sulfonic acid; Lewis acids such as aluminum chloride and zinc chloride, and acidic salts such as $NaHSO_4$ and $KH_2PO_4$, water is the preferable solvent. However, organic solvents may be employed, provided they do not adversely affect the fibers and are capable of dissolving the formaldehyde and acid.

The concentration of formaldehyde in the solution is not limited to any fixed value. Acid is employed as a catalyst, but curing may be carried out in the presence of an acid in an amount greater than the amount needed as a catalyst. Curing is generally carried out at a temperature ranging from room temperature to 100° C. in a liquid environment. In many cases it is preferred to effect curing by heating the uncured fiber in a liquid and gaseous environment. Also it is often desirable to carry out curing in the presence of a salt such as sodium sulfate or ammonium sulfate, under which circumstances adherence of fibers does not occur.

The typical mechanical properties of the cured fibers would be: tensile strength 1.0–4.0 g/d, break elongation 5–40%.

Various conventional textile techniques may be employed to process the cured fibers of the present invention into a variety of useful forms. By virtue of their high hygroscopicity and ready dyeability with clear deep colors, such fibers are very useful for a wide variety of clothing fabrics. By virtue of their resistance to flame, such fibers when made into fabrics are well suited for flame protective clothing, and such fibers, in suitable forms, may be used as materials having heat and chemical resistance. The flame-retardant fibers of this invention may also be mixed with other fibers, such as wool, silk, cotton, polyamide fibers, polyester fibers and polyacrylic fibers.

The following examples are given for the purpose of further illustration of the present invention. In these examples, the content of methylene bond in the amino resin is measured by Iodometry usually employed to measure formaldehyde.

EXAMPLE 1

A mixture comprising 32 parts of melamine, 21 parts of 37% aqueous formaldehyde and 0.3 part of 35% hydrochloric acid were heated in 135 parts of DMSO at a temperature of 60° C. for three hours with stirring.

The solution of the reaction mixture was poured into several times of methanol as the precipitating agent to obtain a solid resin which was treated by vacuum drying for three hours to remove the methanol and a very small amount of the solvent to obtain 35 parts of melamine formaldehyde resin, having 90% methylene content.

Next, this resin was dissolved in DMSO at 60° C. to prepare a uniform solution having a concentration of 21%. 52 parts of PVA having a degree of polymerization of 2000 and hydrolysis (mol %) of 98.5–99.4 (NH- 20, manufactured by Nihon Gosei Kagahu Co. Ltd.) were dissolved in 295 parts of DMSO at a temperature of 60° C. for two hours with stirring to obtain a uniform solution. The aforesaid resin solution was added at 50° C. with stirring for three hours to obtain a uniform mixed solution, which solution was spun as a spinning solution through spinning nozzles, each having a diameter of 0.08 mm, into a coagulating bath of sodium sulfate/water (20/100). The resulting undrawn yarn was continuously drawn, at a draw ration of 3, in sodium sulfate/water (30/100), and washed sufficiently with water to remove the remaining solvent and salt, and was then dried.

The dried yarn was further drawn at a ratio of 3 on a hot plate at 230° C. by the usual method.

To cure, drawn yarn was immersed at 50° C. in a mixture of 10 parts of 37% aqueous formaldehyde, 10 parts of concentrated sulfuric acid, 10 parts of sodium sulfate and 70 parts of water. The cured yarn was removed, washed with water and dried in air at about 80° C. The denier of the resulting yarn was 4.5 and had an average tensile strength of 1.8 g/d, an average break elongation of 20%, and an average elastic modulus of 38 g/d. This fiber was self-extinguishing and showed an affinity for acidic dyes. Under standard conditions of 65% relative humidity and 20° C., the fiber came to equilibrium from the dry state at 8.5%.

EXAMPLE 2

32.8 parts of melamine, 39.4 parts of benzoguanamine and 38.8 parts of 37% aqueous formaldehyde were dissolved at 80° C. in 294 parts of DMSO. 4 parts of 35% hydrochloric acid were added to the resulting DMSO solution and heated at 80° C. for six hours with stirring. The methylene content of this resin was 80%. 26 parts of PVA having a degree of polymerization of 2600 and hydrolysis (mol %) of 98.5–99.4 (NH-26, manufactured by Nihon Gosei Kagahu Co. Ltd.) was dissolved little by little at 80° C. in DMSO to prepare a 17.3% solution. Thereafter, the aforesaid resin solution was added to the PVA solution and the mixed solution was stirred for three hours at a temperature of 50° C. A solution having a viscosity of about 60 poises at 50° C. and polymer concentration of about 14% by weight was obtained.

This solution was spun through spinning nozzles, each having a diameter of 0.08 mm, into a methanol coagulating bath. The resulting yarn was continuously drawn 6 times in methanol and in hot air at 220° C. The drawn yarn was self-extinguishing and had an average tensile strength of 2.5 g/d, and an average break elongation of 7%.

Next, the drawn yarn was cured at 30° C. for 20 minutes in a curing solution comprising 5 parts of sulfuric acid, 5 parts of 37% aqueous formaldehyde, 10 parts of sodium sulfate and 80 parts of water. This yarn had an average tensile strength of 1.6 g/d, and an average break elongation of 11%. The flame-retardancy of this fiber was excellent.

EXAMPLE 3

A mixture comprising 65 parts of melamine, 60 parts of urea and 120 parts of 37% aqueous formaldehyde was dissolved at 60° C. in 600 parts of DMSO 3 parts of 35% hydrochloric acid was added to this solution and then heated at 60° C. for five hours with stirring. The methylene content of this condensate was 92%. This reaction mixture was blended with a 12% DMSO solution containing 143 parts of PVA having a degree of hydrolysis (mol %) between 98.5 and 99.4 (NH-33, manufactured by Nihon Gosei Kagahu Co. Ltd.) to obtain a uniform spinning solution. This solution was spun through spinning nozzles, each having a diameter of 0.08 mm, into a sodium sulfate-water ($Na_2SO_4$/water = 20/100) coagulating bath.

The undrawn yarn was drawn 9 times and treated with heat at 220° C. This yarn was then cured by heat treating at 40° C. for 15 minutes in an aqueous solution containing each 10% by weight of 37% aqueous formaldehyde, concentrated sulfuric acid and sodium sulfate.

The cured yarn was washed with water and dried in air at about 80° C. The resulting yarn had an average denier of 3.5, an average tensile strength of 2.3 g/d and an average break elongation of 29%.

This fiber was of a fire-proofing property and dyeable with clear acidic dyes.

EXAMPLE 4

40 parts of urea and 54 parts of 37% aqueous formaldehyde were dissolved at 60° C. in 206 parts of DMSO and a small amount of sodium hydroxide was added to prepare the methylol urea. Next, 2 parts of 35% hydrochloric acid was added to the resulting DMSO solution and heated at 60° C. for five hours with stirring. The urea resin in the solution was analyzed by Iodeometry to have methylene content of 85%. The solution was diluted with 160 parts of DMSO and 40 parts of PVA having a degree of polymerization of 2000 and hydrolysis (mol %) of 98.5-99.4 (NH-20, manufactured by Nihon Gosei Kagahu Co. Ltd.) and blended little by little to obtain a uniform solution.

The thus obtained spinning solution was extruded through a spinneret into a coagulating bath composed of a sodium sulfate solution and thereafter, the coagulated yarn was drawn 8 times and then treated with heat at 225° C.

The drawn yarn was immersed at 50° C. for 30 minutes in a curing solution comprising sulfuric acid, formaldehyde (37%), sodium sulfate and water (10/30/10/50).

The cured yarn had an average tensile strength of 2.0 g/d, an average break elongation of 23% and was self-extinguishing.

EXAMPLES 5–8

32.8 parts of melamine, 39.4 parts of benzoguanamine and 38.8 parts of 37% aqueous formaldehyde were dissolved at 80° C. in 294 parts of DMSO. Next, 14 parts of 35% hydrochloric acid were added to the resulting DMSO solution and heated at 80° C. for six hours with stirring. The methylene content of this condensate was 94%. PVA having a degree of polymerization of 2000 and hydrolysis (mol %) of 98.5-99.5 (NH-20, manufactured by Nihon Gosei Kagahu Co. Ltd.) was dissolved little by little at 80° C. in DMSO to obtain a solution of 15% solid polymer content.

The two aforesaid solutions were mixed to prepare spinning solutions containing 25, 40, 60, 85% of PVA.

Each of these spinning solutions was spun through spinning nozzles, each having a diameter of 0.08 mm, into a solvent-water (DMSO/water = 30/70) coagulating bath containing 5% of sodium hydroxide and 10% of sodium chloride.

The undrawn yarn was continuously drawn and cured by the same method as in Example 1.

The mechanical properties and fire-proofing (LOI) property of this fiber were as follows:

| Example | Amino resin (wt.%) | PVA (wt.%) | Tenacity (g/d) | Elongation (%) | L.O.I.* (%) |
|---|---|---|---|---|---|
| 5 | 75 | 25 | 1.5 | 12 | 35 |
| 6 | 60 | 40 | 2.9 | 18 | 30 |
| 7 | 40 | 60 | 3.8 | 26 | 28 |
| 8 | 15 | 85 | 5.5 | 32 | 22 |

*Limiting oxygen index

EXAMPLE 9

A mixture comprising 31 parts of melamine, 38 parts of benzoguanamine and 36 parts of 37% aqueous formaldehyde were dissolved in 296 parts of DMSO. Into this solution, 14 parts of concentrated sulfuric acid was poured and stirred for five hours at 60° C.

74 parts of PVA having a degree of polymerization of 2000 and hydrolysis (mol %) of 98.5–99.4 (NH-20, manufactured by Nihon Gosei Kagahu Co. Ltd.) was dissolved in 338 parts of DMSO.

The two aforesaid solutions were mixed to prepare the spinning solution.

This solution was spun through spinning nozzles, each having a diameter of 0.08 mm, into a solvent-water (DMSO/water = 20/80) coagulating bath containing ammonium sulfonate ( $(NH_4)_2SO_4$/solvent-water = 20/100).

The undrawn yarn was continuously drawn 9 times and cured by the same method as in Example 1.

The resulting yarn had an average denier of 3.2, an average tensile strength of 2.3 g/d, an average break elongation of 19% and an average elastic modulus of 45 g/d.

The fire-proofing property of this fiber was excellent and clearly dyeable with acidic dyes.

EXAMPLE 10

Using the same part of phosphoric acid in place of the sulfuric acid used in Example 9, the amino resin was polymerized in DMSO and mixed with PVA (NH-20) having a degree of hydrolysis (mol %) of 98.5–99.4. The resulting solution was spun through a spinning nozzle having a diameter of 0.08 mm into a solvent-water (DMSO/water = 20/80) coagulating bath containing 20% by weight of ammonium phosphonate and a small amount of ammonium hydroxide. The undrawn yarn was continuously drawn 3 times in the wet solution and then 3 times at 220° C.

The resulting yarn was superior in fire-proofing without curing, and had an average denier of 4.2, an average tensile strength of 2.9 g/d, an average break elongation of 12% and an average elastic modulus of 40 g/d.

EXAMPLE 11

18.7 parts of benzoguanamine and 10.5 parts of 37% aqueous formaldehyde were condensed in 60 parts of DMSO at 85° C. for three hours in existence of 0.3 part of 35% hydrochloric acid with stirring. The methylene content of this resin was 80%.

This reaction mixture was blended with 12% DMSO solution containing 13.5 parts of PVA having a degree of polymerization of 2300 and hydrolysis (mol %) of 87–89 (GH-23, manufactured by Nihon Gosei Kagahu Co. Ltd.) to obtain a uniform spinning solution. This solution was spun through spinning nozzles, each having a diameter of 0.1 mm, into a coagulating bath of sodium sulfate-water ($Na_2SO_4$/water = 20/100) containing a small amount of sodium hydroxide. The undrawn yarn was drawn 8 times and then heat treated at 220° C.

The drawn yarn was cured by treating at 50° C. for 15 minutes in a curing solution of 37% aqueous formaldehyde, concentrated sulfuric acid, sodium sulfate and water (10/10/10/70 by weight).

The resulting yarn had an average denier of 3.6, an average tensile strength of 2.1 g/d and an average break elongation of 14%. The fire-proofing property of this fiber was superior.

EXAMPLE 12

10 parts of melamine, 5 parts of benzoguanamine, 5 parts of urea and 15.3 parts of 37% aqueous formaldehyde were dissolved in 107.7 parts of DMSO at 60° C. with stirring. Then, 3.7 parts of 35% hydrochloric acid was added and then was stirred at 60° C. for one hour. The methylene content of the resulting resin was 60%.

Next, 128.6 parts of DMSO and 22.3 parts of PVA having a degree of polymerization of 1800 hydrolysis (mol %) of 98.5–99.4 (NH-18, manufactured by Nihon Gosei Kagahu Co. Ltd.) were added portion by portion to the aforesaid solution and then stirred at 70° C. for two hours. Viscosity of this solution was 117 poises at 50° C.

This spinning solution was spun, drawn and cured by the same method as in Example 1. The resulting yarn had an average denier of 3.7, an average tensile strength of 2.8 g/d, an average break elongation of 22% and an average elastic modulus of 42 g/d.

EXAMPLE 13

32.8 parts of melamine, 39.4 parts of benzoguanamine and 38.8 parts of 37% aqueous formaldehyde were dissolved in 294 parts of NMP. 14 parts of 35% hydrochloric acid were added and stirred at 80° C. for five hours. The methylene content of this resin was 92%.

26 parts of PVA, having a degree of polymerization of 2000 and hydrolysis (mol %) 98.5–99.4 (NH-20, manufactured by Nihon Gosei Kagahu Co. Ltd.), were dissolved in HMPA to prepare a solution of 10% solid polymer content. The aforesaid two solutions were mixed at 50° C. with stirring. The solution showed 35 poises at 30° C.

This spinning solution was spun, drawn and cured by the same method as in Example 1.

The mechanical properties of this cured yarn was as follows: denier: 3.7, tenacity: 2.2 g/d, elongation: 12%, elastic modulus: 40 g/d. The fire-retardancy of this fiber was very superior.

EXAMPLE 14

A mixture comprising 48 parts of melamine, 47.1 parts of 37% aqueous formaldehyde, 3 parts of PVA having a degree of polymerization of 2000 and hydrolysis (mol %) of 98.5–99.4 (NH-20, manufactured by Nihon Gosei Kagahu Co. Ltd.) and 3 parts of 1 N sodium hydroxide solution was dissolved in 277.2 parts of water. After heating this solution at 80° C. for 1 hour, 39.6 parts of 35% hydrochloric acid were added and stirred at 80° C. for 70 minutes. The methylene content of the resulting resin was 90%.

This amino resin solution was blended with a solution containing 60 parts of PVA (NH-20) and dissolved in 273.3 parts of water and then stirred for two hours at 30° C. Viscosity of this solution was 53 poises at 30° C. and after seven hours was 56 poises at 30° C.

This solution was spun through spinning nozzles,

The mechanical properties and L.O.I. of the resulting drawn uncured and cured yarns are shown in the table below.

|  | Example No. | Amino/PVA (resin wt. ratio) | Denier (d) | Tenacity (g/d) | Elongation (%) | Elastic modulus (g/d) | L.O.I. (%) |
|---|---|---|---|---|---|---|---|
| drawn yarn | 16 | 70/30 | 2.6 | 3.1 | 8 | 80 | 38 |
|  | 17 | 40/60 | 2.7 | 4.4 | 9 | 95 | 32 |
|  | 18 | 40/60 | 2.7 | 5.8 | 14 | 105 | 27 |
| cured yarn | 16 | 70/30 | 2.9 | 2.2 | 15 | 40 | 40 |
|  | 17 | 60/40 | 2.9 | 3.1 | 27 | 46 | 36 |
|  | 18 | 40/60 | 3.0 | 3.7 | 30 | 52 | 29 | each having a diameter of 0.08 mm, into a sodium sulfate/sodium hydroxide/water, (25/5/100) coagulating bath at 30° C. The resulting undrawn yarn was continuously drawn 3.5 times in sodium sulfate/water (20/100) and washed with water to remove the sodium sulfate, and then dried. The dried yarn was further drawn 3 times on a hot plate at 220° C. by the usual method. The cured yarn was prepared as in Example 1.

The denier of the resulting yarn was 2.8, the tensile strength averaged 2.9 g/d, the break elongation averaged 24% and the elastic modulus averaged 45 g/d.

This fiber was self-extinguishing and showed an affinity for acidic dyes.

EXAMPLE 15

48 parts of melamine, 12 parts of urea and 47.1 parts of 37% aqueous formaldehyde were dissolved in 366.6 parts of water containing 2.7 parts of 1 N aqueous sodium hydroxide. After stirring at 80° C. for 75 minutes, 39.6 parts of 35% hydrochloric acid were added and then heated at 80° C. for 145 minutes. The methylene content of amino resin in the emulsion was 88%. This emulsion was blended with 383.3 parts of 20% aqueous PVA solution to obtain a uniform spinning solution.

This spinning solution was spun through spinning nozzles, each having a diameter of 0.1 mm, into a coagulating bath comprising sodium sulfate-water (30/100). After drawing 9 times, the drawn yarn was cured by the same method as in Example 1. The cured yarn had an average denier of 2.2, an average tensile strength of 3.2 g/d, an average break elongation of 20%, and was self-extinguishable.

EXAMPLES 16-18

The resin solution was prepared in accordance with the procedure described in Example 14.

PVA, having a degree of polymerization of 2000 and hydrolysis (mol %) 98.5-99.4 (NH-20), was dissolved portion by portion at 80° C. in water to prepare a solution of 20% solid polymer content. The aforesaid two solutions were mixed to prepare a spinning solution containing 70/60/40% of resin. Viscosities of these solutions were as follows:

| Example | Amino resin/PVA (weight) | Viscosity (poise) (30° C.) |
|---|---|---|
| 16 | 70/30 | 12.7 |
| 17 | 60/40 | 27.4 |
| 18 | 40/60 | 107.0 |

Each of these spinning solutions was extruded through the spinneret into a coagulating bath composed of sodium sulfate, sodium hydroxide and water (25/5/100) and thereafter, treated in accordance with the procedure described in Example 14.

EXAMPLE 19

27 parts of melamine, 3 parts of benzoguanamine and 22.3 parts of 35% hydrochloric acid was stirred in 135 parts of water at 70° C. for 1 hour. 18.7 parts of 37% aqueous formaldehyde was added to this solution and then stirred at 70° C. for 1 hour. Methylene content of this resin was 94.5%.

PVA having a degree of polymerization of 1700 and hydrolysis (mol %) 97-98 (AH-17 manufactured by Nihon Gosei Kagaku Co. Ltd.) was dissolved in water to prepare a solution of 15% solid polymer content. The aforesaid two solutions were mixed to prepare a spinning solution.

The ratio of amino resin to PVA was about 55/45. Viscosity of this solution was 46 poises at 30° C.

This spinning solution was spun through spinning nozzles, each having a diameter of 0.08 mm into a sodium sulfate-water ($Na_2SO_4$/water = 20/100) coagulating bath. Coagulating yarn was drawn and cured the same as in Example 14.

Mechanical properties of the cured yarn was as follows: denier: 4.1, tenacity: 3.2 g/d, elongation: 28%, elastic modulus 59 g/d. This fiber was self-extinguishing and an affinity for acidic dyes.

EXAMPLE 20

48 parts of melamine, 12 parts of urea, 47.1 parts of 37% aqueous formaldehyde and 60 parts of PVA, having a degree of polymerization of 1400 and hydrolysis (mol %) 98.5-99.4 (NH-14, manufactured by Nihon Gosei Kagahu Co. Ltd.), were dissolved in 1060.7 parts of water. After stirring this mixture at 80° C. for one hour, 39.6 parts of 35% hydrochloric acid were added and stirred at 60° C. for one hour. The methylene content of this resin was 78% and viscosity of the solution was 47.6 poises at 30° C.

This spinning solution was spun and coagulating yarn was drawn and cured the same as in Example 11.

This yarn was self-extinguishable and its mechanical properties were as follows: denier: 3.4, tenacity: 2.8 g/d, elongation 28% and Young's modulus 47 g/d.

The following is claimed:

1. A flame retardant fiber capable of being cross-linked comprising about 80-5% by weight of polyvinyl alcohol having a degree of hydrolysis (mol %) between about 85 and 99.4 and about 20-95% by weight of an amino resin condensate having at least 50% methylene groups, whereby only a small amount of reactive hydroxy methyl groups are present in said amino resin, based on the formulation:

$$Me = \frac{\text{methylene groups in the amino resin (moles)}}{\text{sum of hydroxymethyl and methylene groups in the amino resin (moles)}} \times 100$$

wherein Me represents the methylene groups, said amino resin being the condensate of formaldehyde and an amino compound selected from the group consisting of melamine, cyclohexyl melamine, guanamine, benzoguanamine, acetoguanamine, urea, methylurea and mixtures thereof, in the presence of an acid catalyst.

2. A flame retardant fiber in accordance with claim 1, wherein the molar ratio (F/A) of formaldehyde (F) to the amino compound (A) of the resin is 0.7–1.5.

3. A flame retardant fiber in accordance with claim 1, wherein the methylene percentage based on the sum of hydroxymethyl groups and methylene groups in the amino resin condensate is more than about 70%.

4. A flame retardant fiber in accordance with claim 1 including condensate reaction products of formaldehyde and monomers selected from the group consisting of sulfamide, guanidine, aniline, phenol and xylene.

5. A flame retardant fiber as recited in claim 1 wherein said catalyst is an acid selected from the group consisting of hydrochloric acid, sulfuric acid, phosphoric acid, oxalic acid, and formic acid.

6. A flame retardant fiber as recited in claim 1 wherein said catalyst is a Lewis acid.

7. A flame retardant fiber as recited in claim 1 wherein said catalyst is a sulfonic acid.

8. A flame retardant fiber as recited in claim 5 wherein said catalyst comprises hydrochloric acid.

9. A flame retardant fiber as recited in claim 5 wherein said catalyst comprises sulfuric acid.

10. A flame retardant fiber as recited in claim 5 wherein said catalyst comprises phosphoric acid.

11. A flame retardant fiber as recited in claim 1 wherein the methylene percentage based on the sum of hydroxylmethyl groups and methylene groups in said amino resin condensate is at least 80%.

12. A flame retardant fiber as recited in claim 1 wherein the methylene percentage based on the sum of hydroxymethyl groups and methylene groups in said amino resin condensate is at least 90%.

13. A flame-retardant fiber in accordance with claim 1 in which the fiber is cured and contains an increase in methylene linkages.

14. A flame-retardant fiber in accordance with claim 13 having a tensile strength of at least 1.0 g/d and a break elongation of at least 5%.

15. A flame retardant fiber as recited in claim 14 having an elasticity modulus of at least about 40 g/d.

* * * * *

UNITED STATES PATENT OFFICE
CERTIFICATE OF CORRECTION

PATENT NO. : 4,138,445
DATED : February 6, 1979
INVENTOR(S) : Tatsuo Nogi et al

It is certified that error appears in the above-identified patent and that said Letters Patent are hereby corrected as shown below:

Col. 5, line 54, delete "formaization" and insert therefor --formalization--.

Col. 7, line 64, after the term "DMSO", insert --,--.

Signed and Sealed this

Third Day of July 1979

[SEAL]

Attest:

Attesting Officer

LUTRELLE F. PARKER
Acting Commissioner of Patents and Trademarks